United States Patent [19]

Rowland et al.

[11] Patent Number: 5,801,970
[45] Date of Patent: Sep. 1, 1998

[54] MODEL-BASED FEATURE TRACKING SYSTEM

[75] Inventors: Patricia J. Rowland, Orlando; Kevin A. Kreeger, Tampa; Albert R. Sanders, Orlando, all of Fla.

[73] Assignee: Martin Marietta Corporation, Bethesda, Md.

[21] Appl. No.: 568,286

[22] Filed: Dec. 6, 1995

[51] Int. Cl.$^6$ ...................................... G01S 17/06
[52] U.S. Cl. ........................... 364/578; 342/63; 342/64
[58] Field of Search ............................ 395/502, 500, 395/391, 958; 364/413.13, 424.027, 424.029, 424.031, 424.032, 424.033, 424.038, 424.039, 231.9; 342/63–65

[56] References Cited

U.S. PATENT DOCUMENTS

| | | | |
|---|---|---|---|
| 4,220,967 | 9/1980 | Ichida et al. | 358/105 |
| 4,639,774 | 1/1987 | Fried | 358/105 |
| 4,700,307 | 10/1987 | Mons et al. | 364/453 |
| 4,707,647 | 11/1987 | Coldren et al. | 318/568 |
| 5,036,474 | 7/1991 | Bhanu et al. | 364/516 |
| 5,087,916 | 2/1992 | Metzdorff et al. | 342/64 |
| 5,166,689 | 11/1992 | Pankow | 342/77 |
| 5,259,040 | 11/1993 | Hanna | 382/41 |
| 5,422,828 | 6/1995 | Choate et al. | 364/516 |
| 5,564,650 | 10/1996 | Tucker et al. | 244/3.17 |

FOREIGN PATENT DOCUMENTS 2 239 369  6/1991  United Kingdom ............ G01S 17/66

OTHER PUBLICATIONS

Y.S. Fong, "A Rule-Based Pattern Matching System for the Recognition of Three-Dimensional Line Drawn Objects: – A Foundation for Video Tracking", published 1986, Clarkson University, Potsdam, N.Y.

N. Kazor, "Target Tracking Based Scene Analysis", published in Aug. 1984, Maryland University, College Park, MD.

P. Bonnin et al., "Tracking in Infrared Imagery Based on a Point of Interest/Region Cooperative Segmentation", Third International Conference on Image Processing and its Applications, Jul. 18–20, 1989.

I. L. Ayala et al., "An Algorithm for a Moving Target Tracker Using Feature Matching", Fourteenth Asilomar Conference on Circuits, Systems, & Computers., Nov. 1980.

P. M. Narendra et al., "Advanced Target Tracking by Dynamic Scene Analysis", SPIE, vol. 219, pp. 148–155, 1980.

O. Silvén et al., "Solutions for Real–time Visual Tracking", SPIE, vol. 1708, pp. 184–195 1992.

J. P. Morgenstern, "Use of Knowledge in Electro–Optical Trackers", SPIE, vol. 1110, pp. 144–149, 1989.

R.A. Samy et al. "Dynamic Scene Analysis and Video Target Tracking", Proceedings of the 7th International Conference on Pattern Regocnition, vol. 2, pp. 993–995, Jul. 30–Aug. 2, 1984.

*Primary Examiner*—Kevin J. Teska
*Assistant Examiner*—A. S. Roberts
*Attorney, Agent, or Firm*—Burns, Doane, Swecker & Mathis, L.L.P.

[57] ABSTRACT

Methods and apparatus providing model-based feature tracking for location assessment of a sensor platform, or tracking of a feature are disclosed wherein a series of predictive models are developed to predict a location of features in subsequently acquired sensor data. Feature location data acquired by a sensor in a previous platform position assessment is used to build a model corresponding to anticipated feature locations in data acquired for a present platform position assessment.

24 Claims, 10 Drawing Sheets

|   | 0 | 1 | 2 | . . . | 383 |
|---|---|---|---|---|---|
| 0 | $m_1$ | $m_2$ | $m_3$ | $m_4$ ...... | $m_{384}$ |
| 1 | $m_1$ | $m_2$ | $m_3$ | $m_4$ ...... | $m_{384}$ |
| 2 | $m_1$ | $m_2$ | $m_3$ | $m_4$ ...... | $m_{384}$ |
| . | . | . | . | . | . |
| 215 | $m_1$ | $m_2$ | $m_3$ | $m_4$ ...... | $m_{384}$ |

|   | 0 | 1 | 2 | . . . | 383 |
|---|---|---|---|---|---|
| 0 | $x_1$ | $x_2$ | $x_3$ | $x_4$ ...... | $x_{384}$ |
| 1 | $x_1$ | $x_2$ | $x_3$ | $x_4$ ...... | $x_{384}$ |
| 2 | $x_1$ | $x_2$ | $x_3$ | $x_4$ ...... | $x_{384}$ |
| . | . | . | . | . | . |
| 215 | $x_1$ | $x_2$ | $x_3$ | $x_4$ ...... | $x_{384}$ |

|   | 0 | 1 | 2 | . . . | 383 |
|---|---|---|---|---|---|
| 0 | $y_1$ | $y_2$ | $y_3$ | $y_4$ ...... | $y_{384}$ |
| 1 | $y_1$ | $y_2$ | $y_3$ | $y_4$ ...... | $y_{384}$ |
| 2 | $y_1$ | $y_2$ | $y_3$ | $y_4$ ...... | $y_{384}$ |
| . | . | . | . | . | . |
| 215 | $y_1$ | $y_2$ | $y_3$ | $y_4$ ...... | $y_{384}$ |

|   | 0 | 1 | 2 | ... | 383 |
|---|---|---|---|---|---|
| 0 | $x_1$ | $x_2$ | $x_3$ | $x_4$ ... | $x_{384}$ |
| 1 | $x_1$ | $x_2$ | $x_3$ | $x_4$ ... | $x_{384}$ |
| 2 | $x_1$ | $x_2$ | $x_3$ | $x_4$ ... | $x_{384}$ |
| ... | . | . | . | . | . |
| 215 | $x_1$ | $x_2$ | $x_3$ | $x_4$ ... | $x_{384}$ |

|   | 0 | 1 | 2 | ... | 383 |
|---|---|---|---|---|---|
| 0 | $y_1$ | $y_2$ | $y_3$ | $y_4$ ... | $y_{384}$ |
| 1 | $y_1$ | $y_2$ | $y_3$ | $y_4$ ... | $y_{384}$ |
| 2 | $y_1$ | $y_2$ | $y_3$ | $y_4$ ... | $y_{384}$ |
| ... | . | . | . | . | . |
| 215 | $y_1$ | $y_2$ | $y_3$ | $y_4$ ... | $y_{384}$ |

MODEL-BASED FEATURE TRACKING SYSTEM

BACKGROUND

The present invention relates to scene tracking systems, and in particular to methods and apparatus for maintaining a correct point of reference within sensor image data when there is relative movement between a sensor platform and the scene, or object, being scanned.

Scene tracking typically involves navigating a vehicle along a desired course. Tracking systems utilize scanning, imaging, or sensing to gather image data of a terrain over which the vehicle is travelling. The image data is compared to a scene map, or like data, and stored within the system to continually locate a specific point or pattern in a sequence of images acquired by the sensor. From this, the vehicle's position is determined. There are two modes of tracking: general scene tracking (navigation), and feature tracking (homing).

In general tracking, the reference point can be based on discernable feature(s) in the data acquired by the sensor. Feature location data is used to orient the sensor platform relative to the tracked features and thus determine its location. In homing, the sensor platform is guided to a specific point, typically by using feature location data to maintain the specific point at the center of the sensor image.

One general problem encountered with tracking systems is the offset factor introduced by the movement of the sensor platform. This results when the scene viewed by a sensor changes between the acquisition of successive images. A common solution is to re-locate a selected reference point within each image data to re-orient the system. Hence, accurately maintaining, or locating, the selected point of reference is critical to making an accurate position assessment.

Displacement problems are not limited to homing and navigation tracking systems. Other systems involving tracking, such as seismic and medical imaging systems, robotic vision systems, radio and telescopic astronomy, radar systems, mapping and remote sensing systems (i.e., satellite) also must compensate for displacement offset in successive sensor images. For example, constant mechanical adjustment of a telescope is required to compensate for the rotation and orbit of the earth when the telescope is tracking a celestial object. Electronic imaging systems used in the aforementioned technical fields are similarly susceptible to offset errors. Such systems include ultrasound, infra-red sensing, magnetic resonance imaging, and robotic vision systems.

One system for providing scene tracking involves the formation of a model based on previously gathered (a priori) data of the scene or object being viewed or investigated. So called model-based tracking develops a model based upon a selected feature(s) from the a priori data (such as a satellite reconnaissance photograph) to predict the location of features in a subsequently acquired image. The a priori model is developed based, in part, on a known displacement of the sensor platform between successive location assessments. The sensor gathers image data which is compared to the model until a match between the prediction and the actual image is achieved. Based on the conditions of the match, such as the sensor roll angle and depression angle, the sensor, or sensor platform can be repositioned, or reoriented as needed. In some cases (homing) this may involve positioning the platform to place the selected reference point in the center of the sensor image.

A prior art model-based tracking system is described in the paper "Real Time Identification of Fixed Targets" delivered at the Twentieth AIPR Conference in October 1991. The paper describes a model-based targeting system for a weapons delivery vehicle. In the described system, a priori data is used to develop a model description specific to features appearing in the a priori data. In particular, the system utilizes previously acquired information, such as a reconnaissance photograph, to build models for tracking a selected feature(s) through successive images acquired by an image sensor. The a priori data model is used to predict the location of features in images acquired by a FLIR sensor. At each position assessment point on the vehicle's flight path, a predictive model is built using the a priori data in combination with a known delivery vehicle displacement. Each a priori-based model is compared with image data gathered by the FLIR sensor to locate the selected features from which a location assessment is made. A processor is used to implement a pattern matching process to compare model predictions of feature locations with feature location data derived from sensor image data.

While such systems perform generally satisfactorily, they are prone to the effects of cumulative errors resulting from use of a priori-based models over the succession of position assessments. That is, by repeatedly using the a priori data to build the predictive models throughout the delivery vehicle's flight path, model-based errors are continuously re-introduced and may become cumulatively more severe. As a result, the delivery vehicle may stray from a desired path. Furthermore, because the system uses a priori based data to construct the predictive models, there is no capacity to learn from, or improve the model, based on newly acquired image data. The system's re-use of "stale" data at each position assessment point disallows advantages available from using new sensor image data. Hence, the solution speed is fixed because no consideration is given to newly acquired information. In addition, if the feature, or its surroundings, have changed since acquisition of the a priori data, the a priori data may not be able to provide the requisite information for accurate tracking or homing. Examples of such a situation include where structure has been added or removed from a tracked feature since the a priori data on the tracked feature was procured.

Additionally, when the delivery vehicle is in close proximity to the target, problems arise due to the acquired image of a tracked feature exceeding the field-of-view (FOV) of the sensor. When this happens the model data may fail to provide the requisite detail of the target for the system to track properly. That is, the models can no longer provide pattern matching data from which to extract the necessary tracking information. As a result, the delivery vehicle may mistrack. Model-based systems for detecting subsurface features, such as seismic and medical imagers also may fail to detect such features, or may mis-identify such features, due to this phenomena.

SUMMARY

It is an object of the present invention to provide improved tracking in a model-based system by reducing cumulative errors.

It is a further object to provide accurate, up-to-date tracking information based on a predictive model which is built based on data acquired by a sensor.

It is still a further object to provide for accurate tracking when a sensor platform and an object being sensed are in close proximity.

A model-based tracking system operating in accordance with the invention utilizes a succession of predictive models to anticipate the location of features in acquired sensor data. A first model can be based on a priori data, however, unlike prior art systems, subsequent models are built based on acquired sensor data. Each predictive model is then compared to data subsequently acquired by a sensor to determine the accuracy of the prediction. Once a match is found between the model and the sensor data, appropriate action is taken to correct the position of the sensor platform, to adjust the sensor itself, or to provide a correction factor with which to adjust sensor data. A new predictive model is then built from the sensor data corresponding to the match. Use of this "fresh" sensor data to develop predictive models provides a number of advantages over prior art systems.

By utilizing data acquired by the sensor, predictive models contain current information and detail reflecting actual conditions. This can be especially useful in close proximity homing. Actual sensor data provides the detail needed to continue providing tracking feedback as the sensor platform approaches the feature being tracked. Prior art systems rely on a priori data which fails to provide sufficient detail for close proximity tracking. Furthermore, actual condition data provided by the sensor tends to be more robust than that derived from the a priori information. In addition, the iterative corrections provided by preparation of models based on sensor data results in faster feature matching because the predictive model conforms more closely to the acquired image data. The inventive technique is faster than cumbersome conventional methods that rely on varying "guesses" of the sensor viewing parameters to obtain a match.

In particular, a system operating in accordance with the invention provides a method for gathering sensor data at location assessment points by forming a succession of models each of which corresponds to a location assessment point and each containing model feature location data for predicting the location of features in corresponding sensor data. A first model can be prepared based on a priori data, however, subsequent models are formed based on data from a preceding location assessment point. At each location assessment point, a sensor data set is acquired for each sensor orientation in a sensor scan pattern. Sensor feature location data is extracted from each of the sensor data sets. Sensor feature location data and model feature location data are compared until a match is achieved. The sensor is adjusted to align a point of reference based on the sensor conditions corresponding to the match.

Alternatively, a system incorporating the invention involves an apparatus for maintaining a correct point of reference as a sensor scans an object where the sensor and/or the object move relative to the other. The apparatus includes a sensor for sensing the object to produce image data. Means for extracting feature location data from the image data is provided as are means for using feature location data to prepare a succession of models. The models contain information regarding anticipated feature locations in subsequently gathered image data. Means are provided for comparing each model to corresponding image data acquired by the sensor in subsequent images, as is means for determining when a match occurs between model data and image data. Based on the comparison, a sensor adjustment, sensor platform reorientation, or like correction, is made.

DESCRIPTION OF DRAWINGS

The foregoing, and other objects, features and advantages of the present invention will be more readily understood upon reading the following detailed description in conjunction with the drawings in which.

DETAILED DESCRIPTION

Figure 1:
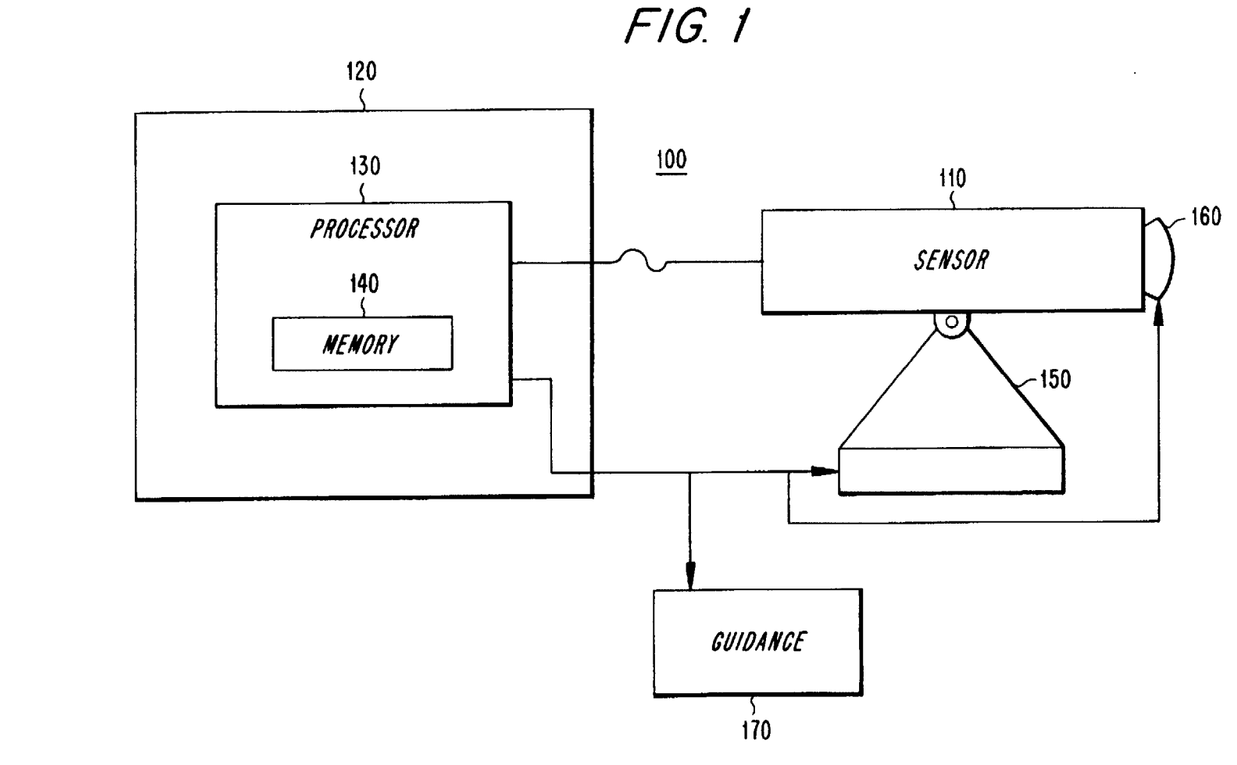
FIG. 1 depicts an apparatus which operates in accordance with a preferred embodiment of the invention.

FIG. 1 illustrates a generic sensor platform 100 incorporating the invention. The system includes a sensor 110 and a processing unit 120. The processing unit 120 typically includes a data processor 130 which contains a memory 140. The sensor 110 can be mounted on an adjustment mechanism 150, and also may include a focusing device (or focal element) 160. The processing unit 120 is capable of communicating a signal to the adjustment mechanism 150, the focusing device 160, and/or a guidance module 170.

Sensor 110 may be any of a variety of sensors. These include any device operating on the premise of detecting acoustic or electromagnetic emissions for the purpose of imaging an object. Such devices may operate on the basis of ultrasound, infra-red, visible, ultraviolet, radio, radar, or x-ray radiation. Applicable sensors include IR detectors, video cameras, ccd imagers, synthetic aperture radar devices, parabolic or phased array antennas, ultrasound detectors, or any other like device. The sensing system also may include a focal element(s) 160 to aid in directing radiation to the sensor 110. Such focal elements 160 may include lenses, filters, and wave guides. In accordance with the invention, these focal elements may be manipulated appropriately based on a calculated offset or like adjustment factor. In addition, the sensor 110 may be mounted on the adjustment mechanism 150 such as an adjustable gimbal, slide, ball and socket, or similar device, in order to appropriately direct the sensor 10. Of course, the sensor can also be a hand-held device.

The data processor 130 may be an off-the-shelf CPU, ASIC, programmable logic array, or arrangement of discrete components. Alternatively, processing may be performed by a background computing system, such as a PC, workstation, or mainframe. A suitable data processor 130 should be able to receive and manipulate signals from the sensor 110 (or converted data corresponding to such signals), perform feature extraction, prepare models, and provide comparison processing between model data and. sensor data. The data processor 130 may utilize a memory 140, as needed, for storage and manipulation of sensor and model data. The data processor is capable of communicating information derived from the comparison processing to the adjustment mechanism 150, the focal element 160, or the guidance mechanism 170. Alternatively, the results of comparison processing can be used for appropriate calibration or correction of sensor data.

Operating to control a computer in accordance with the invention, a process in accordance with an exemplary embodiment can be embodied on a machine readable medium such as magnetic media, CD ROM, RAM, or other memory medium. Embodied as such, the memory medium contains computer readable program code which causes the data processor 130, or a like device or system, to carry out the process in accordance with the present invention.

Figure 2:
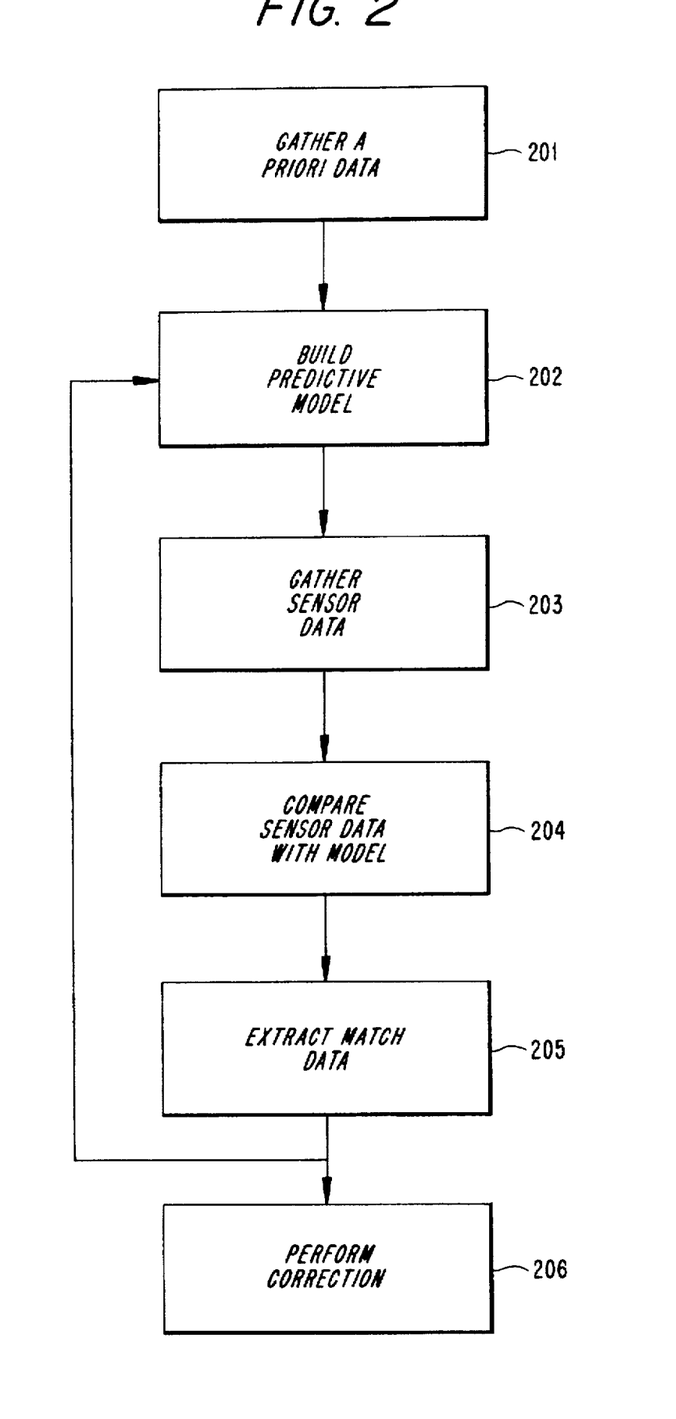
FIG. 2 is a flowchart of operation in accordance with an embodiment of the invention.

Operation of the sensor platform 100, in accordance with an embodiment of the invention is illustrated by the flow-chart depicted in FIG. 2. The process involves acquiring a priori data of some form (block 201). This may be data in the form of a satellite photograph or satellite radar-type mapping image (e.g., micro- or millimeter-wave topographical data), airborne reconnaissance photograph, or 3-D contour image. In a medical imaging setting, the a priori data might be anatomical data. A first predictive model is developed from the a priori data (block 202). It is desirable that the model predict the location of some feature from the perspective of the sensor when the sensor is at a specified position or within a predetermined area (hereinafter referred to as the "location assessment position"). When the sensor platform is at the location assessment position; or when an object, or a portion of an object being scanned passes by a sensor, sensor data is gathered (block 203). This gathering can be any of a variety of techniques for scanning the area in which the desired feature is expected to be located. Information gathered for a particular location assessment position is in the form of a plurality of data sets. Sensing can involve taking images as the sensor moves over an area or over an object. Sensing also can involve the sensor cycling through a series of sensor orientation positions (the latter which also can be applied when the object and sensor are stationary relative to each other). Such cycling can be performed by incrementally adjusting a sensor mount, such as the adjustment mechanism 150, by cycling the focal element 160 through a predetermined variety of positions, or by performing a raster-scan with the sensing element. Data sets gathered for each of the individual scan cycles can be stored for later comparison. In the alternative, each data set can be immediately compared with model data to achieve "rolling" match processing.

The sensor data is compared with the model data at block 204 in order to extract a match (block 205). Once a match is found, the conditions of the match are noted and a correction is performed (block 206). A correction can involve any number of adjustments such as repositioning the sensor platform by moving control surfaces or steering mechanisms (e.g., guidance mechanism 170); reorienting the adjustment mechanism 150, or the focal element 160; or providing a calibrating adjustment, or sensor data adjustment factor within the processing unit 120. The particulars of the matched sensor data are passed to the model building process (block 202) to build a new predictive model. Hence, a next model is based on the sensor data that corresponds to the match.

Figure 3:
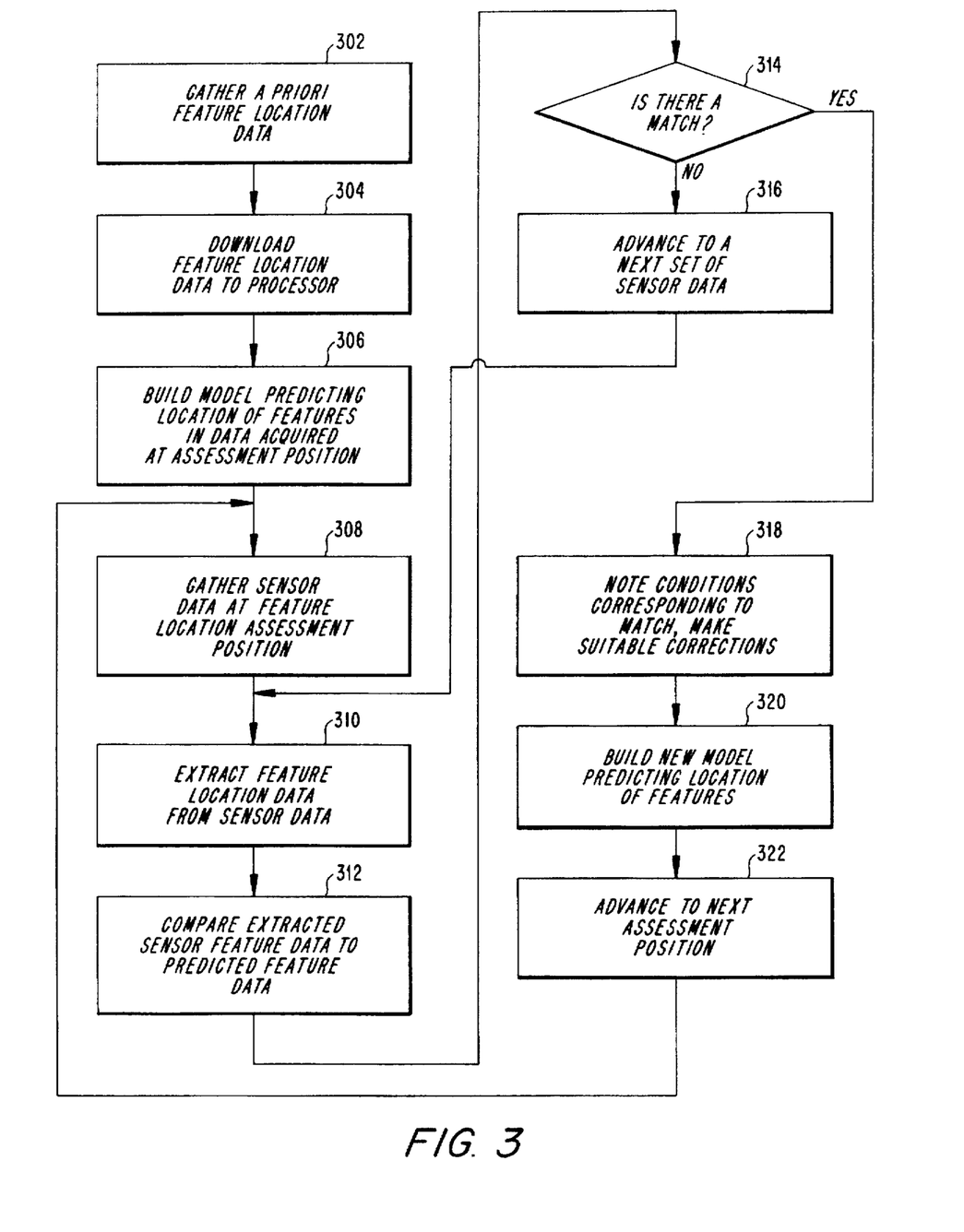
FIG. 3 depicts a flowchart of operation in accordance with another embodiment of the invention.

A second preferred embodiment of a method in accordance with the invention is illustrated in a flow chart depicted in FIG. 3. In this embodiment a priori information containing feature location data is gathered at block 302. Feature location data from the a priori information is downloaded to a processor at block 304. A first predictive model is built based on the a priori information (block 306). In building the model, the a priori model data is manipulated, based on a known, or expected, displacement of a sensor platform, and a known orientation of a sensor to predict the anticipated location of the extracted features in data acquired by the sensor when the platform is at a known location assessment point. Once at a location assessment position, sensor data is gathered in the form of data sets (block 308). In accordance with a preferred embodiment, each of the sets corresponds to an image gathered by the sensor 110 as it cycles through a scan pattern. Feature location data is extracted from each sensor data set at block 310. The extracted feature location data, in accordance with a preferred embodiment, also is downloaded to a processor. The predictive location data from the model is compared (block 314) with feature location information extracted from sensor image data set (see block 312). If a match is not found for a particular data set, the process advances to a next data set (block 316) and feature data is extracted for a next comparison (block 310). When a match is found, at block 314, between feature location data from the model and the sensor data, the particular orientation, or scan pattern setting ("match data"), of the sensor 110 is noted (see block 318). The sensor data corresponding to the match, or a difference between the match data and the predicted data can be utilized to make any necessary calibrations, corrections, or adjustments. For example, the system can perform any necessary corrections or adjustments to the sensor or platform orientation to correct a point of reference.

The model built based on a priori data is then replaced with a new model based on the sensor feature location data corresponding to the match (block 320). This new model can be manipulated to predict the anticipated location of extracted features from sensor data at a next location assessment point. The process continues as described above using match data as a basis for building new predictive models.

The feature characteristic used to create a model can be based on a correlation operator of any of a variety of different forms. Typically edge magnitudes and directions are used, but more complex correlation operators (e.g., "wheel," "door," "star," "tree") may be used if such characteristics can be automatically extracted from sensor data. Tracked features typically are man-made objects and, as such, exhibit recognizable patterns (e.g., straight lines, intersections, corners of buildings, doors, windows, etc.). From information as minimal as an overhead photograph, such patterns can be extracted or inferred. The use of such patterns reduces the complexity of the modeling task, provides rapid solutions, and allows for an initial model to be built from minimal a priori scene information.

Once the feature is extracted from the a priori data, relevant information such as the feature's relative location, are downloaded to the data processor 130. Prior to downloading, the model feature data may be converted into a symbolic representation to conform it to the particular data processor, or to prepare it for the selected model comparison technique. Feature location data extracted from data sets gathered by the sensor 110 as it cycles through its scan pattern, also may be converted into an appropriate symbolic representation prior to downloading it to the data processor 130.

Once both model and sensor feature data are downloaded, the sensor feature location data is compared to the model feature location data. Successive data sets are gathered for each scan pattern position until a match is determined. Preferably, this comparison is done using a Hough transform. The Hough transform is useful for detection applications when the shape of the tracked feature can be well defined, but where there is little information regarding the location of the tracked feature. The method basically involves developing a model of the object to be detected in coordinates relative to a single reference point, extracting parts of the object in the image searched, using the extracted parts to "vote" for the location of the reference point in the searched image. A large accumulation of votes in a localized area indicates a strong pattern match. A strong pattern match is indicated by large peaks in a Hough accumulator array. The positions indicated by these peaks correspond to the features selected for reference point location, which in turn indicates matching sensor data.

An advantage of using the Hough transform technique is that it allows for identification of an object without having to "see" all of the object's parts. Portions of the object may be missing or occluded and the method still may allow for identification. In addition the degree of missing parts to which the technique is tolerant is adjustable. For example, a high degree of tolerance increases the chance of false identification, but also increases the chances of identifying a highly occluded object. The technique also is tolerant of noise and, to a lesser degree, distortion.

Matched sensor feature data in a present comparison is used as a basis for the model feature data in a next comparison. After appropriate transfer, or designation, of the match data as the basis of a new model, a predictive model is built to predict the anticipated position of the selected features at a next platform position assessment point. After displacement of the sensor platform 100 (i.e., arrival at the next platform position assessment point), new sensor data is gathered, and feature location information extracted therefrom is downloaded for comparison to the new model data.

The processes used to perform the feature identification do not change when a new feature to be identified, or tracked, is input to the system. Rather, the feature model descriptions are changed. Consequently, substituting one feature model for another is all that is required to track a newly selected feature.

With respect to the processing unit 120, real time operation can be achieved by implementing the system on a massively parallel single instruction, multiple data (SIMD) architecture. Such parallel processor hardware architecture is utilized to administer model descriptions and to implement the generalized Hough transform for the purpose of manipulating feature data from the models and sensor data. In a preferred embodiment, any of the series of GAPP™ chips, which are SIMD computers developed at Martin Marietta, may be utilized. The GAPP chips are discussed in detail in U.S. Pat. Nos. 4,739,474 and 5,421,019, which are incorporated herein by reference.

A basic GAPP chip contains individual processing cells arranged in rows and columns. Each cell consists of a single-bit arithmetic and logic unit (ALU), random access memory (RAM), registers, control, and multiplexing circuitry for executing an instruction set and controlling communications between cells. A large processing array can be implemented by interconnecting multiple GAPP chips in a two-dimensional arrangement. A GAPP arrangement used in a preferred embodiment comprises an array of 216 rows by 384 columns. Each GAPP cell is capable of simultaneously storing feature information corresponding to both model and acquired image data. While a GAPP chip array is utilized in a preferred embodiment, any suitable array or data storage means is acceptable for achieving a desired purpose in view of cost, performance, or quality requirements.

The following description of a preferred embodiment of the invention involves a sensor platform operating to guide the sensor platform over known terrain to a selected feature. The given description is merely exemplary, and is not to be construed as limiting the scope or applicability of the invention.

Figure 4:
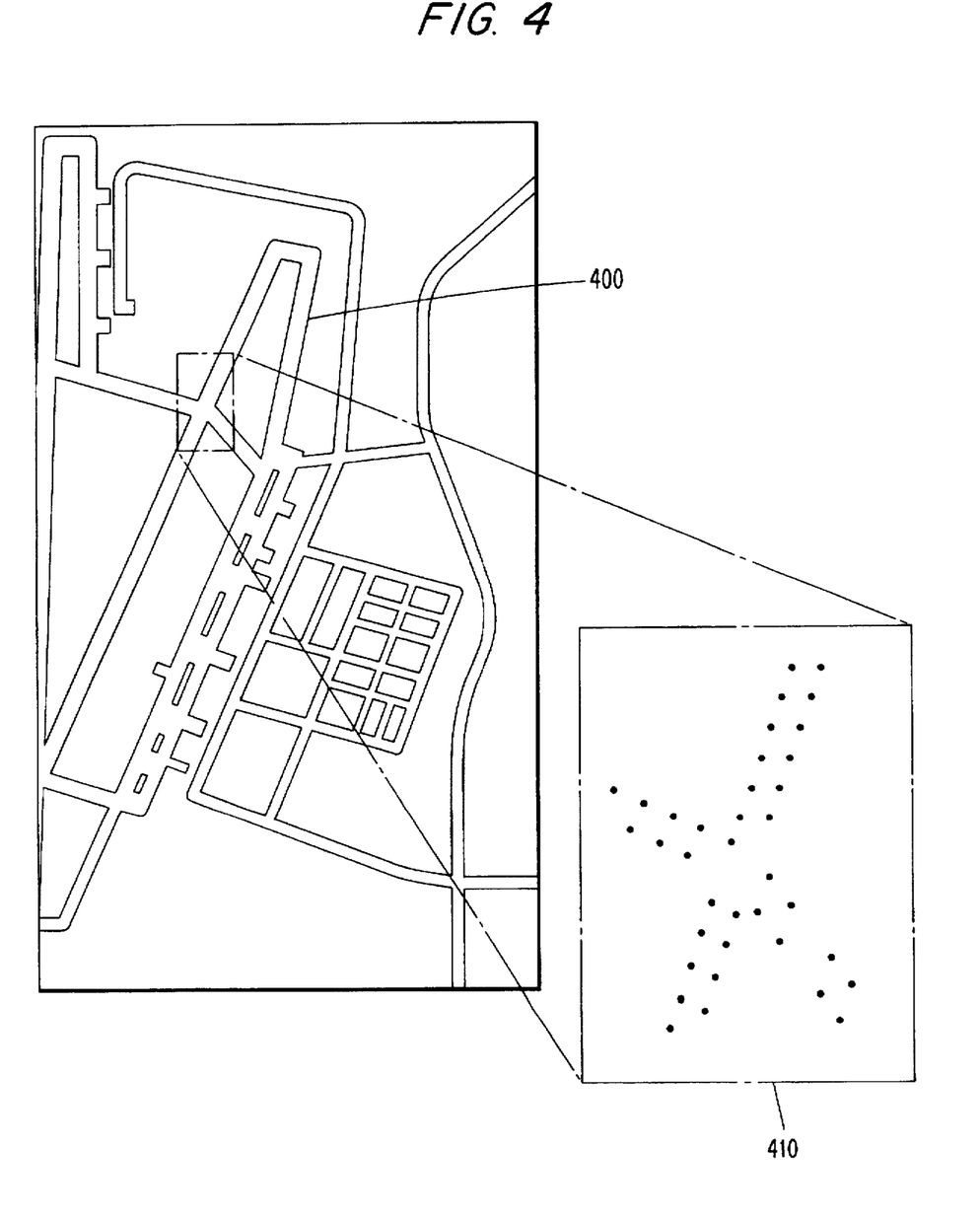
FIG. 4 depicts typical a priori data and a symbolic feature representation derived therefrom.

FIG. 4 shows a typical reconnaissance photograph containing a runway 400. Such a structure is typical of a feature which may be extracted from a priori or sensor data to form a model. In a preferred embodiment, a first predictive model is built from feature data which is manually extracted from the a priori data. That is, the a priori data is screened by a technician, or analyst, to determine which features are most suitable for tracking purposes. Location data is determined from the selected features which is stored in the GAPP. Prior to arriving at a first comparison point, the feature location data is manipulated within the GAPP to predict the location of the selected features in image data gathered by the sensor 10 at the first position assessment point.

Preparation of an initial, a priori-derived model involves generating a wire-frame symbolic representation of the features appearing in the a priori data (e.g., photographs, blueprints, etc.). Points from the straight lines of the wire-frame representation may be selected to conform the data to the GAPP array. In the embodiment described, the patterns used to define the features are straight line edges. Edges may be formed at the intersection of two-dimensional planes. Initial one-time GAPP processing may be necessary to rotate the a priori data model features to match the anticipated viewing geometry, based on the known orientation of the sensor and the terrain.

The selected points from the symbolic representation are vertically arranged down the left column of the GAPP array. Hence, for a typical implementation, the total number of points selected to represent model feature data is limited to the number of rows in the GAPP array. The distance between selected points is adjusted to produce the maximum number of selected points without overflowing the array. FIG. 4 at 410 depicts model edge points that have been selected from the lines that make up the runway.

Information pertaining to the selected points 310 comprise the features used to recognize the features in image data gathered by the sensor 110 at a position assessment point. Each feature may be represented by three three-dimensional vectors wherein the first vector represents the feature location relative to a specified reference point, the next vector defines the direction of the edge at that location, and the last vector provides the direction of the line normal to the edge.

A general location and orientation of the features is known from the a priori data. The location and orientation of the sensor 110 is also known at the time an image is gathered. A priori feature model data can therefore be rotated to match the expected viewing geometry. The anticipated appearance (model) of actual features in the sensor imagery can be represented by a two-dimensional projection of the rotated model features. This version of the rotated model identifies which of the features are observable from the sensor perspective. It also provides the edge slope and location relative to the specified reference point.

Projection of x- and y- components of a model feature edge direction vector onto the two-dimensional plane yields the values required to compute the expected slope of the model feature. The projected x- and y- components of the location vector represent the anticipated horizontal and vertical distances from the feature to the specified reference point, respectively. The projected z component of a normal vector is used to determine whether the feature may be observable from the sensor viewing perspective, wherein features having a positive value are deemed to reside on surfaces that are visible.

Figure 5:
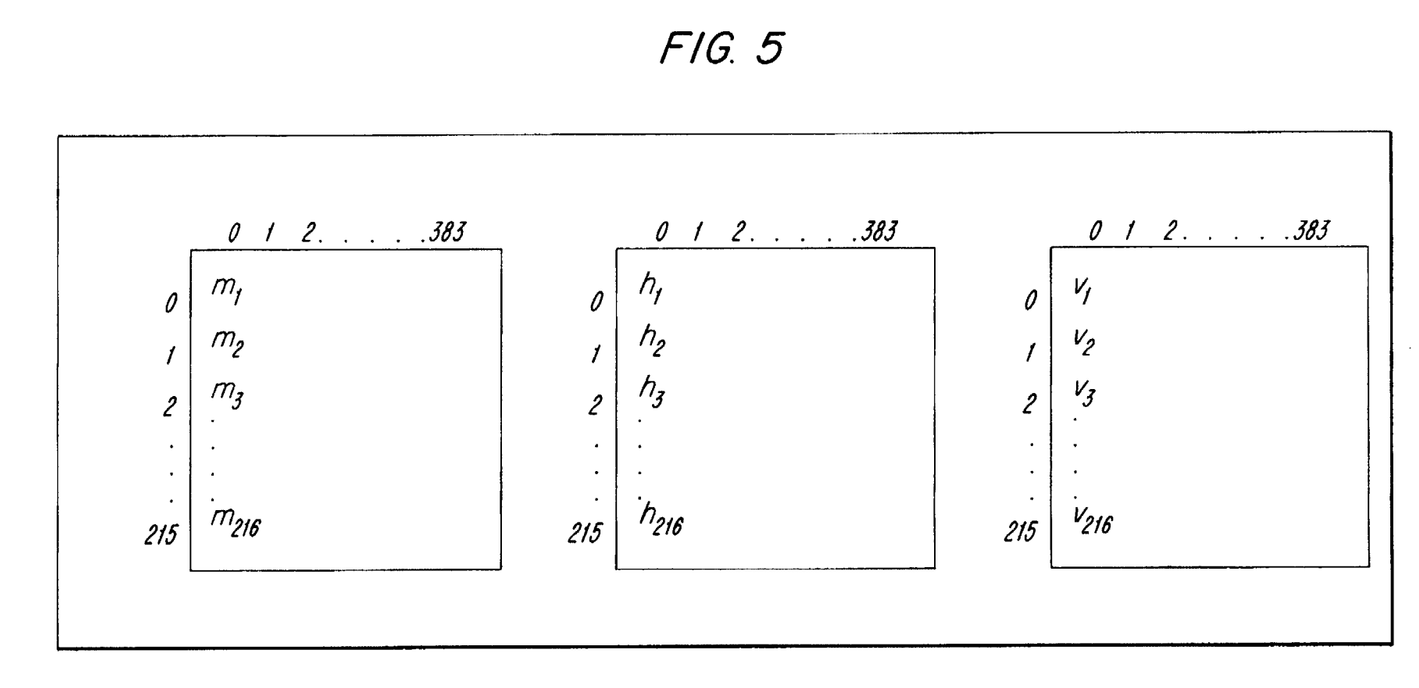
FIG. 5 depicts arrangement of data in a GAPP chip.
Figure 6:
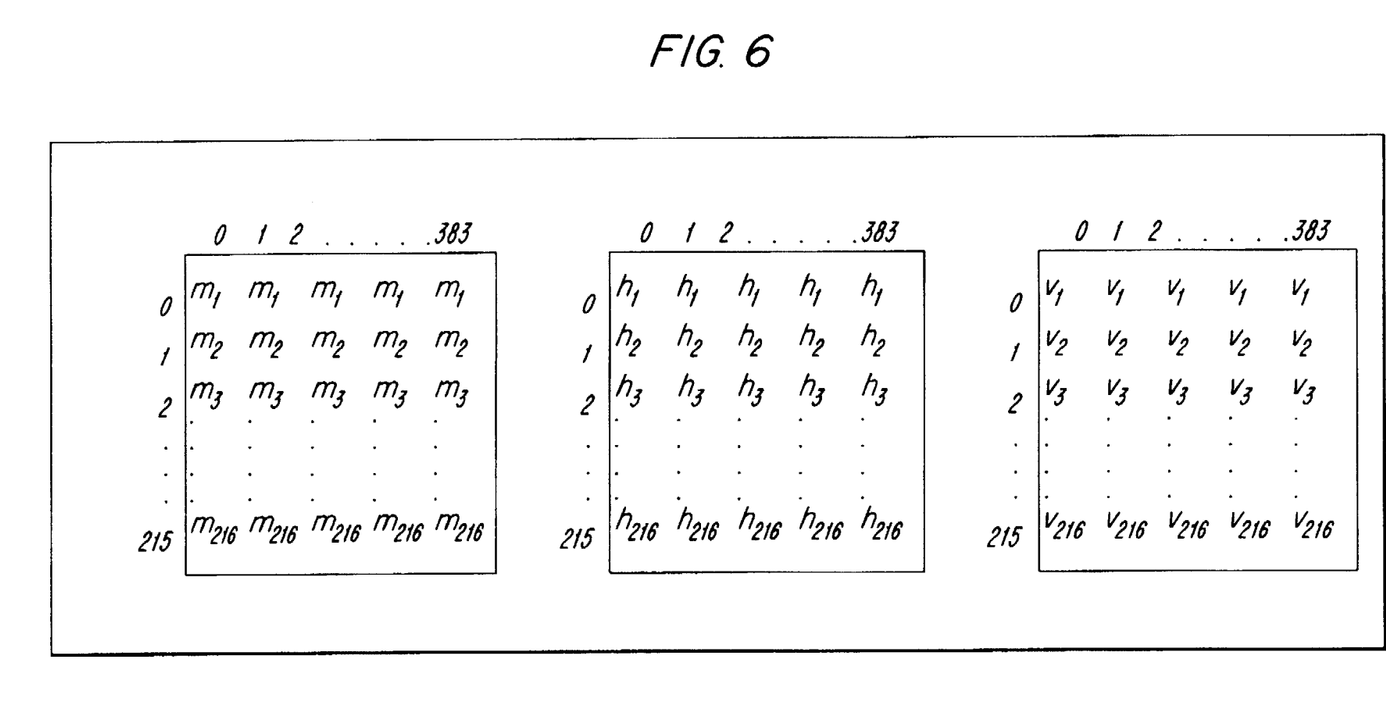
FIG. 6 depicts arrangement of data in a GAPP chip.

Two-dimensional model image features are numbered sequentially and the corresponding information is arranged along the left-most column in the GAPP array. FIG. 5 shows a single-plane view of the model data stored in the GAPP. These variables may require multiple bit planes for storage. In a preferred embodiment, model data is characterized according to three separate blocks of information: slopes of the edges (m), horizontal distances from the reference point (h), and vertical distances from the reference point (v). The top-left pixel in the array stores the slope, the horizontal and the vertical offsets from the reference point for a first feature. The left-most pixel on the second row of the array holds the data for a second feature, etc. The feature location data is predicted in accordance with a known change in viewing geometry (position displacement). Model feature data is then broadcast (repeated) horizontally across the array (i.e., every cell contained in a given row will have the value associated with the left-most element of that row). FIG. 6 shows the arrangement of the model features following broadcast. The model data is now set. The next step involves preparation of the image feature data from images acquired by the sensor.

When the sensor platform 100 arrives at a first position assessment point, the sensor 110 collects a series of sensor data sets, one for each sensor orientation in a sensor scan pattern. For each of these sensor data sets, feature location information is extracted which is compared to the model feature location data stored in the GAPP array.

In a preferred embodiment, an edge operator also is used to extract edge features from the data acquired by the sensor. A dynamic threshold is used to determine the strongest edges of features contained in the sensor data. Selected feature edges are reduced to the same symbolic representation within the GAPP array as the model feature data.

To extract image features from the acquired image data, edge information is extracted from the image data using a standard image edge extraction operation, such as one involving a Sobel operator. The edge magnitudes are thresholded, and selected points (in the form of pixels) along the strongest edges are retained for further consideration. The resulting edge map is thinned producing single-pixel-wide lines of edge pixels. Small gaps in the lines are filled. The thinned, connected edges are partitioned into fixed-length line segments. Preferably, the length of the segments is comparable to the length represented in each feature in the model data. Midpoints of the line segments are identified, and the corresponding slope of the segments are computed from the endpoint coordinates.

Figure 7:
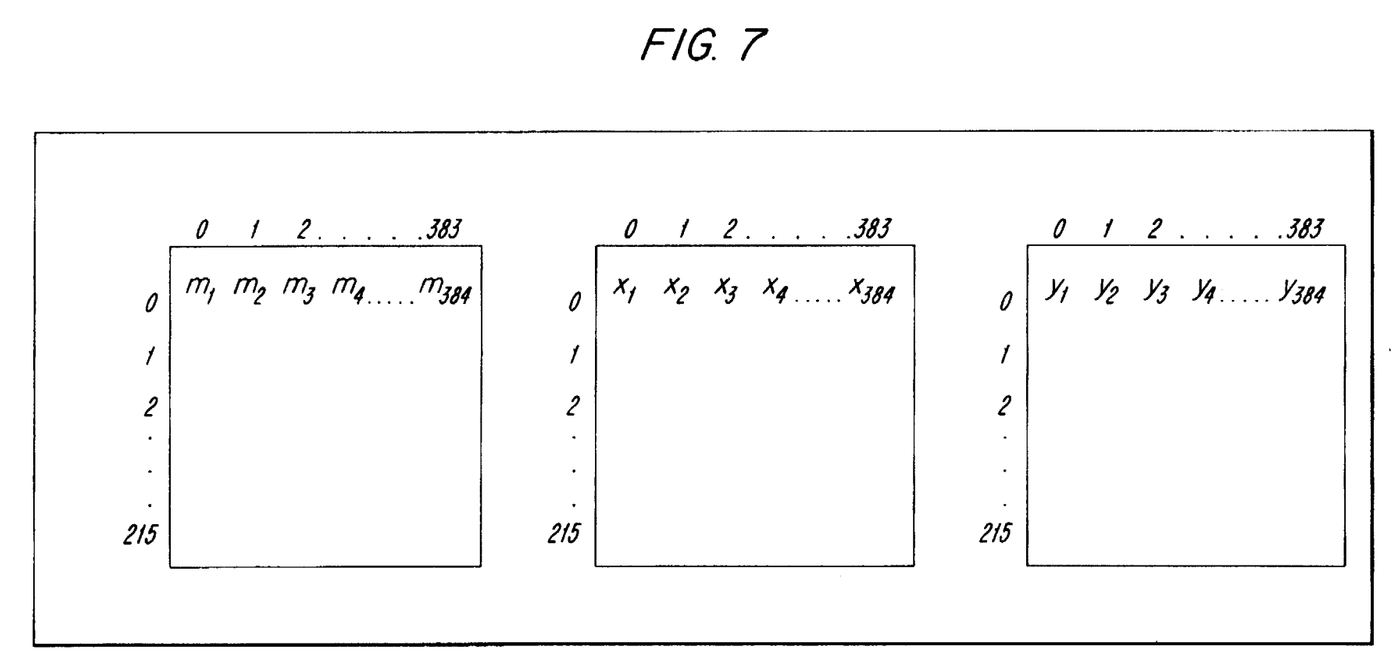
FIG. 7 depicts arrangement of data in a GAPP chip.

Slope and location information from each of the selected line segments is arranged in the GAPP array cells for comparative manipulation with the model features. FIG. 7 indicates the values representing the slope (m), x-coordinate of the midpoint (x), and y-coordinate of the midpoint (y) are organized along the top row of the array (in a different bit plane).

Figure 8:
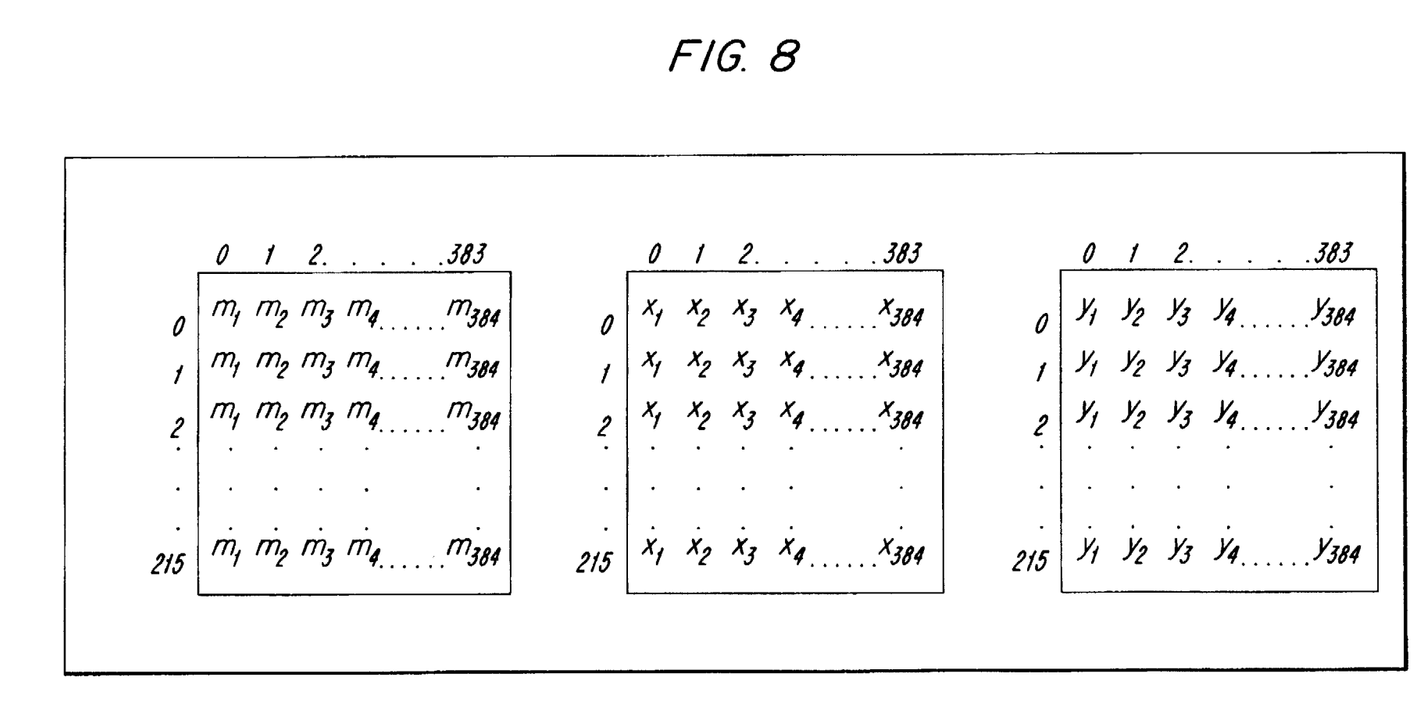
FIG. 8 depicts arrangement of data in a GAPP chip.

The sensor feature data is broadcast (repeated) vertically down the array. Every cell in a given column then has the value associated with the top-most element of that column. This arrangement of the data is depicted in FIG. 8.

Examination of the organized data reveals that the GAPP array contains the cross product of the set of model features with the set of sensor features. It is a simple task to simultaneously compare every sensor feature to every model feature. This capability provides for real time execution rates.

In a preferred embodiment the slope of edges is used to match the model edges with sensor data edges. Any edge from a sensor feature that has a similar slope as a given (2-D projected) model feature is hypothesized to match that model feature. The horizontal and vertical distances from the reference point provided by the model are used in conjunction with the x- and y-coordinates of the sensor feature data to determine where the reference point is located in the sensor feature data, should the hypothesis be correct.

The difference in slopes between the model features and sensor features is calculated, and the locations of slope pairs within a specified limit are flagged. All other pixels are removed from further consideration. Each of the remaining matches is used to "nominate" the reference point.

The generalized Hough transform is used so that a proper extracted sensor feature point, indexed by its slope, nominates a location of a reference point for the feature pattern. The next goal is to identify all true reference points from the profusion of nominations using the Hough accumulation process.

The Hough transform is implemented by adding the relative x and y location values (relative the to the reference point) to the observed x and y location values from current sensor data, respectively to produce the location of the reference point nomination from each pair of feature vectors. The nomination data produced by this process is stored in the GAPP array.

The location of a point to be nominated by a given model/sensor pair is determined by adding the reference point offsets from the model feature to the coordinates of the corresponding sensor feature. The horizontal offset (h) from the model feature is added to the x-coordinate of the sensor feature (x) to provide the x-coordinate of the nomination. The vertical offset (v) from the model feature is added to the y-coordinate of the sensor feature to produce the y-coordinate of the nomination.

A large number of the nomination points are expected to be incorrect, even if the desired pattern exists in the sensor feature data. When the correct pattern does exist, however, large numbers of GAPP cells will nominate the same (true) reference point, or at least a cluster of points close to the reference point.

The array contains the desired data, which can be accessed within real time execution constraints. The values of the reference point coordinates may cluster in sensor data space, but physically be distributed randomly throughout the array, and most, if not all, may be uncorrelated, false nominations.

Nomination clusters will generate peaks in the individual histograms of the x- and y-coordinates of the selected segments. These peaks may be used to narrow the field of nominated reference points.

By starting with the column histogram, for example, the values of the x-coordinate nominations may be compared to the column number in which they reside. If the column number matches the x-coordinate nomination, then a counter is incremented at that location. The x-coordinate nominations are then shifted horizontally one cell. Again, the x-coordinate value is compared to the column number and the associated counter is incremented when a match occurs. This process of shifting and counting is iterated until all of the x-coordinates have passed through all of the columns of the array. The total number of occurrences of any x-coordinate value is produced by summing all the accumulated counts for each column of the array.

A 1-row by 7-column averaging operator may be implemented to smooth the histogram to avoid missing less concentrated clusters. Any column possessing a total count exceeding a specified threshold is selected as a histogram peak. All cells in selected columns are flagged.

In a similar fashion, a histogram for the y-coordinates is produced. The y-coordinate values are compared with a row number they occupy. Shifting is performed vertically, and row totals are summed horizontally. A preferred averaging operator is one column wide and seven rows tall. Cells in the selected rows containing a peak in the histogram are flagged.

Intersection cells flagged as both x-histogram and y-histogram peaks represent the set of selected reference point nominations subject to consideration. While the locations of true clusters are represented within this set, false nominations may remain.

Figure 9:
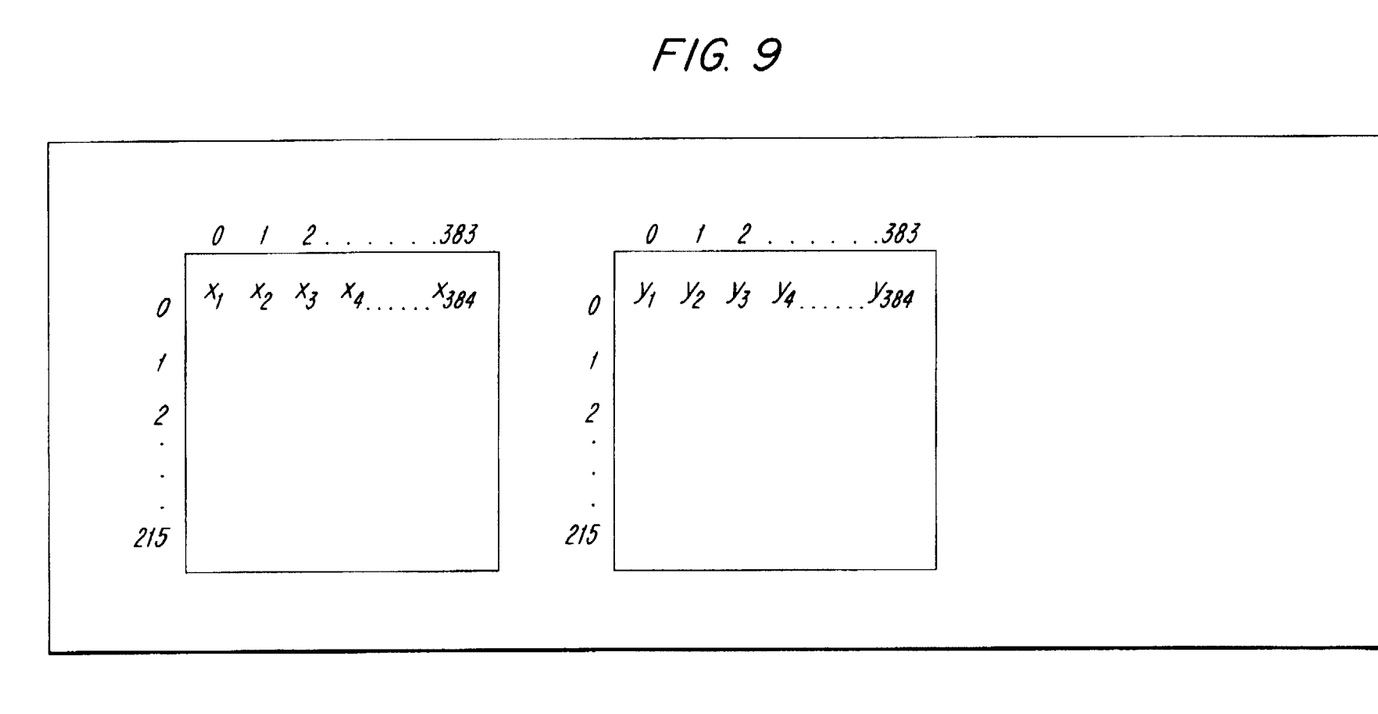
FIG. 9 depicts arrangement of data in a GAPP chip.
Figure 10:
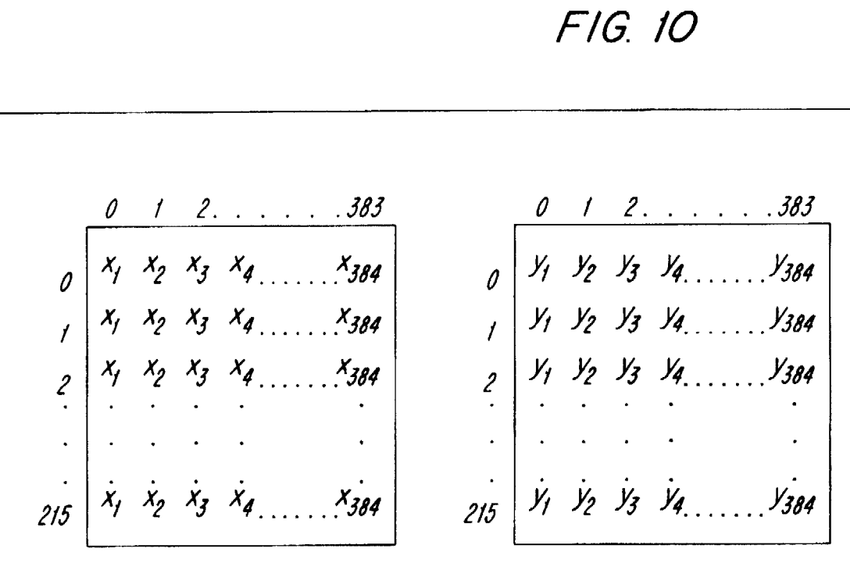
FIG. 10 depicts arrangement of data in a GAPP chip.

Following the selection, the number of reference point nominations becomes manageable (i.e., the number of nomination is less than the number of columns in the array). The nominations are numbered sequentially and their corresponding x- and y-coordinates are arranged along the top row of the array as depicted in FIG. 9 (in a different bit plane within the GAPP). These values are broadcast (repeated) vertically down the array such that each element within a given column contains coordinates for one of the reference point nominations. FIG. 10 depicts this arrangement.

The original set of reference point nominations, too numerous to handle previously, and randomly scattered throughout the array, are used to determine which of the current set of nominations correspond to true clusters. At each cell in the array, any x-coordinate stored from the original nomination process is compared to the x-coordinate for the nomination stored in that column. The y-coordinates are compared in a similar fashion. If the two points represented by this data are within a specified distance of each other, a counter for the appropriate reference point is incremented.

The array of original nominations is then shifted horizontally, one cell, and the coordinates are compared with an appropriate set of selected reference point coordinates. The shift-compare process is iterated until all of the original nominations have been compared to all of the selected nominations. The "votes" contained in the columns are tallied. The coordinates stored in the columns which generate large numbers of matches represent the locations of identified reference points.

When it is determined that a feature(s) has been successfully determined, or matched, position data is used to determine the accuracy of the specified point of reference. In a preferred embodiment, the position data is used to determine a selected point of reference, which in turn is used to mechanically adjust the sensor to place a selected feature being tracked in the center of the image data. That is, the sensor is directed at the object being homed on. In particular, the displacement between the "match" reference point location and the predicted location of the reference point is determined. This information can be used to translate (shift) the model such that the model reference point is overlaid on the match reference point. Next, the displacement of the model parts (the difference between where the model parts were predicted to be and where they are actually found in an image) can be used to adjust sensor adjustment parameters.

Once the location of the selected point of reference has been established, the feature location data from the current sensor data is used as a basis for preparation of a new model for use in comparative processing of a set of sensor data acquired at a next comparison point. Predicted feature locations are redefined in terms of their locations relative to the just-identified reference point position. The relative locations are transformed to their expected relative positions in the next comparison point sensor data, given the known changes in position and the sensor viewing parameters, such as displacement, roll, and depression angle.

Model creation is performed by aligning the sensor feature vectors (from the match data) along the left edge of the GAPP array, replacing the model data previously used. Hence, the matched sensor feature data becomes the new model data by simply arranging it along the left side of the GAPP array. The new predictive model data is manipulated to predict feature locations in sensor data acquired at the next assessment position. Following acquisition of new sensor data, the GAPP array is processed as described above, albeit with new predictive model data.

Because the system has initially performed the orientation adjustment of the array model data to compensate for sensor angles and sensor platform position during the initial a priori model formation, this step need not be performed in subsequent processing. Additionally, the problem of long term drift can be ameliorated by restoring a previous model and using it to verify a currently extracted reference point. For example, if a system is tracking on a small building having a truck parked next to it, checking the a priori data ensures that the system maintains tracking on the building in the event that the truck moves away and subsequent models inadvertently mistake the truck for the original tracked feature. Hence, the tracked featured can be confirmed by returning periodically to the a priori data.

The invention has been described with reference to particular embodiments. However, it will be readily apparent to those skilled in the art that it is possible to embody the invention in specific forms other than those of the preferred embodiments described above. For example, the entire process may be carried out by an algorithm performed in a general purpose or application specific processing unit or computer. This may be done without departing from the spirit of the invention.

An exemplary application of the invention has been described in the context of facilitating tracking. However, one skilled in the art will readily appreciate and recognize that an apparatus or method of operation in accordance with the invention can be applied in any scenario wherein determination of object position, feature recognition, feature tracking, or homing are desirable. For example, while the described embodiments have been directed to applications where one or both of the sensor or the sensed object are moving relative to each other, it will be appreciated that the invention is applicable to a scenario wherein the sensor platform and the sensed object are stationary and the sensor cycles through a scan pattern.

The preferred embodiments are merely illustrative and should not be considered restrictive in any way. The scope of the invention is given by the appended claims, rather than by the preceding description, and all variations and equivalents which fall within the range of the claims are intended to be embraced therein.

What is claimed is:

1. A method for tracking a feature within data gathered by a sensor, the method comprising the steps of:

developing an a priori model corresponding to a first location assessment point, which model contains data identifying the feature and an anticipated location of the feature;

extracting feature location data from sensor data gathered at the first location assessment point;

comparing the extracted feature location data with the anticipated feature location data;

making a correction involving the sensor based on results of the comparison;

building a new model with the feature location data extracted from the sensor data gathered at the first location assessment point; and at the first location assessment point, predicting the location of the feature in sensor data to be gathered at a second location assessment point using the new model.

2. The method as claimed in claim 1 wherein the a priori model is developed based on one of a photograph, topographical data, contour image data, and anatomical data.

3. The method as claimed in claim 1 wherein the step of extracting feature location data includes pattern matching.

4. The method as claimed in claim 1 wherein the step of comparing involves utilizing a Hough transform.

5. The method as claimed in claim 1 wherein the step of making a correction involving the sensor based on results of the comparison includes one of an adjustment to the sensor, reorientation of a platform to which the sensor is attached, calculation of a correction factor, and correcting a reference point.

6. The method of claim 1 further comprising the step of:
replacing the a priori model with the new model.

7. A method for maintaining a point of reference as a sensor scans an object where one of the sensor and the object move relative to the other, the method comprising the steps of:
sensing the object at a present assessment point to produce image data;
extracting feature location data from the image data;
prior to a second assessment point, using the feature location data to prepare a first model which contains information identifying a feature and an anticipated location of the feature in a subsequent image associated with the second assessment point;
comparing the anticipated feature location data in the first model to feature location data extracted from the subsequent image;
determining when a match occurs between the anticipated feature location data in the first model and the feature location data extracted from the subsequent image;
correcting a sensor orientation based on conditions corresponding to when a match occurs between the model data and the subsequent image data; and
replacing the first model with a new model, wherein the new model is constructed using the feature location data extracted from the subsequent image.

8. The method of claim 7 wherein the step of correcting a sensor includes changing an orientation of a platform to which the sensor is attached.

9. A method for tracking a feature within sensor data gathered along a succession of location assessment points, the method comprising the steps of:
acquiring a priori data containing the feature;
extracting first feature location data from the a priori data;
building a first predictive model, based on the first feature location data, which first predictive model contains data identifying the feature and an anticipated location of the feature in sensor data to be gathered at a first location assessment point;
acquiring a plural number of sensor data sets at the first location assessment point, each of the plural sensor data sets corresponding to a sensor orientation in a sensor scan pattern;
extracting feature identification and location data from each of the plural sensor data sets and comparing the extracted feature identification and location data from each data set with the feature identification data and anticipated feature location data associated with the first predictive model until a match is found;
using a sensor orientation corresponding to the match to align the sensor; and
at the first location assessment point, preparing a second predictive model with the extracted feature identification and location data corresponding to the match, wherein the second predictive model contains data identifying the feature and an anticipated location of the feature at a second location assessment point.

10. The method as claimed in claim 9 wherein alignment of the sensor includes one of adjusting the mechanical orientation of the sensor, reorienting a platform to which the sensor is attached, calculating a sensor correction factor, and correcting a point of reference.

11. The method of claim 9 further comprising the step of:
replacing the first predictive model with the second predictive model.

12. A method for providing correction for a sensor in a sensor platform which gathers sensor data at successive position assessment points, the method comprising the steps of:
forming a succession of models each corresponding to one of the position assessment points, wherein each model contains data for predicting the location of features in sensor data to be gathered at a subsequent position assessment point, each model being formed prior to the subsequent position assessment point based on sensor data exclusively associated with a current position assessment point;
acquiring a sensor data set at each position assessment point;
extracting sensor feature location data from each sensor data set;
comparing extracted sensor feature location data and model feature location data to determine a difference between a location of the feature; and
aligning the sensor in accordance with the difference.

13. A method for tracking a feature appearing in successive sensor data sets acquired by a sensor, the method comprising the steps of:
extracting feature location data from a priori information;
forming a first predictive model based on the extracted feature location data, which first predictive model provides anticipated feature location data within a first position assessment area;
acquiring a plural number of first sensor data sets in the first position assessment area;
extracting feature location data from each sensor data set
comparing the extracted feature location data to the anticipated feature location data until a match is found;
correcting the sensor based on conditions corresponding to the match; and
at the first position assessment area, forming a second predictive model from the extracted feature location data corresponding to the match, wherein the second predictive model provides anticipated feature location data for a second position assessment area.

14. The method of claim 13 further comprising the step of:
replacing the first predictive model with the second predictive model.

15. An apparatus for maintaining a correct point of reference as a sensor scans an object where one of the sensor and the object move relative to the other, the apparatus comprising:

means for sensing the object at a first assessment point to produce image data;

means for extracting location data for a feature from the image data;

means for using the feature location data prior to a second assessment point to prepare a model which contains information identifying the feature and an anticipated location of the feature in a first subsequent image associated with the second assessment point;

means for comparing the anticipated location with feature location data extracted from the first subsequent image;

means for determining a match between the anticipated location of the feature and the feature location data extracted from the first subsequent image;

means for performing a correction involving the sensor based on conditions corresponding to the match ; and at the second assessment point, means for using the feature location data extracted from the first subsequent image to prepare a new model which contains information regarding an anticipated location of the feature in a second subsequent image.

16. The apparatus as claimed in claim 15 wherein the correction means performs one of a sensor alignment, sensor platform reorientation, or calculation of a sensor data correction factor to maintain the correct point of reference.

17. The apparatus as claimed in claim 15 wherein the sensing means is one of an infra-red sensor, a radar set, or video camera.

18. The apparatus as claimed in claim 15 wherein a processor is used to perform sensor and model data management.

19. The apparatus as claimed in claim 18 wherein the processor is comprised of at least one GAPP™ chip.

20. The apparatus as claimed in claim 15 wherein the comparing means uses a Hough transform.

21. The apparatus of claim 15 further comprising:

means for replacing the first model with the new model.

22. An apparatus for tracking a feature appearing in data acquired by a sensor, the apparatus comprising:

at a present feature location assessment point, means for preparing a model for predicting a location of the feature in sensor data to be gathered at a future location assessment point, wherein the model is based on feature location data exclusively associated with the present feature location assessment point;

means for extracting feature location data from sensor data gathered at the future location assessment point;

means for comparing the predicted feature location from the model with the feature location data extracted from the sensor data gathered at the future location assessment point;

means for determining when the comparison results in a match;

means for deriving sensor conditions corresponding to the match; and means for correcting a sensor orientation based on the conditions corresponding to the match.

23. An article of manufacture for use in a computer for tracking a feature through a succession of sensor data acquired by a sensor comprising a computer usable medium having computer readable program code means for causing the computer to:

effect acquisition of a first set of data containing feature information associated with a first feature location assessment point;

effect extraction of first feature data from the first set of data;

prior to a second feature location assessment point, effect building of a first predictive model based on the extracted first feature data, which first predictive model provides anticipated feature locations in a second set of data to be gathered at the second feature location assessment point;

at the second feature location assessment point, effect acquisition of the second set of data using the sensor;

effect extraction of feature location data from the second set of sensor data;

effect comparison of feature location data extracted from the second set of sensor data with the location data from the first predictive model to provide a comparison result;

effect use of the comparison result to correct a sensor angle; and effect use of the feature location data extracted from the second set of sensor data to prepare a second predictive model, independent of any feature location data other than the feature location data from the second set of sensor data.

24. The article of manufacture described in claim 23 further comprising computer readable program code means for causing the computer to:

effect replacement of the first predictive model with the second predictive model.

* * * * *